United States Patent
Gupta (10) Patent No.: US 10,887,664 B2
(45) Date of Patent: Jan. 5, 2021

(54) CONTROLLING START TIMES AT WHICH SKIPPABLE VIDEO ADVERTISEMENTS BEGIN PLAYBACK IN A DIGITAL MEDIUM ENVIRONMENT

(71) Applicant: Adobe Inc., San Jose, CA (US)

(72) Inventor: Raman Gupta, Bahadurgarh (IN)

(73) Assignee: Adobe Inc., San Jose, CA (US)

( * ) Notice: Subject to any disclaimer, the term of this patent is extended or adjusted under 35 U.S.C. 154(b) by 444 days.

(21) Appl. No.: 14/988,059

(22) Filed: Jan. 5, 2016

(65) Prior Publication Data
US 2017/0195746 A1    Jul. 6, 2017

(51) Int. Cl.
| | |
|---|---|
| *H04N 21/81* | (2011.01) |
| *H04N 21/6547* | (2011.01) |
| *H04N 21/658* | (2011.01) |
| *H04N 21/442* | (2011.01) |
| *H04N 21/472* | (2011.01) |

(52) U.S. Cl.
CPC ..... *H04N 21/812* (2013.01); *H04N 21/44222* (2013.01); *H04N 21/47217* (2013.01); *H04N 21/6547* (2013.01); *H04N 21/6582* (2013.01)

(58) Field of Classification Search
CPC .......................... H04N 21/845; H04N 21/4333
See application file for complete search history.

(56) References Cited

U.S. PATENT DOCUMENTS

| | | | | |
|---|---|---|---|---|
| 5,818,439 | A * | 10/1998 | Nagasaka | H04N 7/17336 725/87 |
| 6,188,398 | B1 * | 2/2001 | Collins-Rector | G06Q 30/02 348/E5.104 |
| 6,188,650 | B1 * | 2/2001 | Hamada | G11B 19/02 369/30.36 |
| 6,282,713 | B1 * | 8/2001 | Kitsukawa | G06Q 30/02 348/E5.105 |
| 6,349,329 | B1 * | 2/2002 | Mackintosh | G06Q 30/02 709/217 |
| 8,234,386 | B2 * | 7/2012 | Collet | G06Q 30/02 370/386 |
| 8,458,745 | B2 * | 6/2013 | Shanks | H04H 60/31 725/14 |
| 8,625,974 | B1 * | 1/2014 | Pinson | H04N 5/783 386/350 |
| 8,839,306 | B2 * | 9/2014 | Roberts | H04N 7/17318 725/60 |
| 9,363,464 | B2 * | 6/2016 | Alexander | H04N 5/775 |

(Continued)

*Primary Examiner* — An Son P Huynh
(74) *Attorney, Agent, or Firm* — SBMC (57) ABSTRACT

A digital medium environment is described to control a start time at which a skippable video advertisement made available by an advertisement provider begins playback at a client. A skippable video advertisement is selected for playback by the client. Data is queried that identifies a skip time corresponding to a time within the skippable video advertisement at which the skippable video advertisement was skipped during a previous viewing of the skippable video advertisement by a user of the client. One of a plurality of start times associated with the skippable video advertisement is then selected based at least in part on the skip time. The skippable video advertisement and the selected start time are then provided to the client effective to cause the skippable video advertisement to begin playback at the selected start time.

20 Claims, 9 Drawing Sheets

(56) References Cited

U.S. PATENT DOCUMENTS

| | | | |
|---|---|---|---|
| 9,369,778 B2* | 6/2016 | Sangal | H04N 21/812 |
| 9,420,320 B2* | 8/2016 | Doe | H04H 60/31 |
| 2002/0138831 A1* | 9/2002 | Wachtfogel | H04N 5/76 |
| | | | 725/32 |
| 2002/0144262 A1* | 10/2002 | Plotnick | G11B 27/005 |
| | | | 725/32 |
| 2002/0188746 A1* | 12/2002 | Drosset | H04H 20/02 |
| | | | 709/231 |
| 2003/0149621 A1* | 8/2003 | Shteyn | G06Q 30/02 |
| | | | 705/14.68 |
| 2004/0133909 A1* | 7/2004 | Ma | G06Q 30/0207 |
| | | | 725/34 |
| 2004/0221311 A1* | 11/2004 | Dow | G06K 9/00718 |
| | | | 725/52 |
| 2006/0094410 A1* | 5/2006 | Cortegiano | H04M 3/4878 |
| | | | 455/414.3 |
| 2006/0218617 A1* | 9/2006 | Bradstreet | H04N 5/76 |
| | | | 725/135 |
| 2008/0040741 A1* | 2/2008 | Matsumoto | H04N 5/76 |
| | | | 725/32 |
| 2008/0134229 A1* | 6/2008 | Conant | H04N 7/17318 |
| | | | 725/23 |
| 2009/0006191 A1* | 1/2009 | Arankalle | G06Q 30/02 |
| | | | 705/14.71 |
| 2009/0148124 A1* | 6/2009 | Athsani | G06Q 30/02 |
| | | | 386/241 |
| 2009/0222850 A1* | 9/2009 | Darnell | H04N 5/76 |
| | | | 725/32 |
| 2009/0276805 A1* | 11/2009 | Andrews, II | G06Q 30/02 |
| | | | 725/35 |
| 2009/0300670 A1* | 12/2009 | Barish | G06Q 30/02 |
| | | | 725/13 |
| 2011/0069940 A1* | 3/2011 | Shimy | G11B 27/105 |
| | | | 386/296 |
| 2011/0093885 A1* | 4/2011 | Ravula | H04N 7/17336 |
| | | | 725/32 |
| 2011/0145856 A1* | 6/2011 | Agarwal | G06Q 30/02 |
| | | | 725/32 |
| 2012/0114313 A1* | 5/2012 | Phillips | G11B 27/005 |
| | | | 386/298 |
| 2013/0036442 A1* | 2/2013 | Wingert | H04N 21/42209 |
| | | | 725/60 |
| 2013/0144720 A1* | 6/2013 | Hari | G06Q 30/0241 |
| | | | 705/14.55 |
| 2013/0311575 A1* | 11/2013 | Woods | H04N 21/6582 |
| | | | 709/206 |
| 2014/0250479 A1* | 9/2014 | Lee | H04N 7/08 |
| | | | 725/110 |
| 2015/0106856 A1* | 4/2015 | Rankine | H04N 21/8583 |
| | | | 725/60 |
| 2015/0110169 A1* | 4/2015 | Zhou | H04N 19/573 |
| | | | 375/240.02 |
| 2015/0296250 A1* | 10/2015 | Casper | H04N 21/4316 |
| | | | 725/34 |
| 2015/0373396 A1* | 12/2015 | Makhlouf | H04N 21/222 |
| | | | 725/14 |
| 2016/0381427 A1* | 12/2016 | Taylor | G06Q 30/00 |
| | | | 725/13 |
| 2017/0188116 A1* | 6/2017 | Major | H04N 21/4334 |
| 2018/0268435 A1* | 9/2018 | Lee | G06Q 30/0241 |
| 2018/0315096 A1* | 11/2018 | Lewis | G06Q 30/0272 |

* cited by examiner

CONTROLLING START TIMES AT WHICH SKIPPABLE VIDEO ADVERTISEMENTS BEGIN PLAYBACK IN A DIGITAL MEDIUM ENVIRONMENT

BACKGROUND

An advertisement provider may provide skippable video advertisements for playback in a digital medium environment. Such skippable video advertisements may be provided for viewing prior to allowing the user to interact with content (e.g., by viewing a video, listening to music, or accessing information), and enable users to "skip" the advertisement, in order to interact with the content, after the advertisement has played for a predetermined period of time (e.g., 5 seconds). A benefit of skippable video advertisements is that they minimally impact a user's content consumption experience because the user has the choice to skip the video after a short period of time.

From an advertiser's perspective, however, the effectiveness of skippable video advertisements is questionable. For example, if the user watches a skippable video advertisement multiple times, but each time the user skips the advertisement as soon as possible, then the user will simply be watching the same short portion of the advertisement over and over again which may have a minimal impact on conveying the advertisement's message to the user which can thus affect the advertiser as well as content providers that rely on advertisers for revenue.

SUMMARY

A digital medium environment is described to control start times at which skippable video advertisements begin playback. Controlling the start times causes different portions of the skippable video advertisement to be played back over multiple viewing instances. Doing so increases the likelihood that a message of a skippable video advertisement is conveyed to the user by increasing the percentage of the advertisement that the user watches.

A skippable video advertisement is selected for playback by the client, and data is queried that identifies a skip time corresponding to a time within the skippable video advertisement at which the skippable video advertisement was skipped during a previous viewing of the skippable video advertisement by a user of the client. One of a plurality of start times associated with the skippable video advertisement is then selected based at least in part on the skip time. The skippable video advertisement and the selected start time are then provided to the client effective to cause the skippable video advertisement to begin playback at the selected start time.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

A digital medium environment is described to control start times at which skippable video advertisements begin playback in a digital medium environment. Controlling the start times causes different portions of the skippable video advertisement to be played back over multiple viewing instances. Doing so increases the likelihood that a message of a skippable video advertisement is conveyed to the user by increasing the percentage of the advertisement that the user watches.

First, a plurality of start times are associated with a skippable video advertisement, such that each of the plurality of start times corresponds to a different time within the advertisement to begin playback of the skippable video advertisement. For example, an advertiser or marketer can define that a 30 second skippable video advertisement includes start times of 0 seconds, 8 seconds, 15 seconds, and 24 seconds, such that a first portion of the video begins playback at 0 seconds, a second portion of the advertisement begins playback at 8 seconds, a third portion of the advertisement begins playback at 15 seconds, and a fourth portion of the advertisement begins playback at 24 seconds.

An advertiser can define the plurality of start times such that the start times correspond to logical breaks in the skippable video advertisements. In some cases, advertisers may change their creative development process to ensure that different skippable video advertisement portions can be connected or linked by the user even if the user views the different portions over multiple viewing instances.

When an advertisement is selected for communication to a client, one of the plurality of start times associated with the skippable video advertisement is selected based at least in part on data identifying a skip time associated with the advertisement. The skip time corresponds to a time within the advertisement at which the advertisement was skipped during a previous viewing of the advertisement by the user. The advertisement and the selected start time are then provided to the client effective to cause the advertisement to begin playback at the selected start time. If the user has not previously viewed the advertisement, a start time associated with the beginning of the advertisement will be selected, which will cause the advertisement to being playback from the beginning.

During playback of the advertisement, the client can skip the advertisement after the advertisement has been played back for a predefined period of time (e.g., 5 seconds). When this occurs, data identifying a skip time of the advertisement is provided to the advertisement provider. Then, if the advertisement is again selected for the user, a start time is selected based on the skip time corresponding to the time at which the user skipped the advertisement during the previous viewing of the advertisement. Doing so ensures that the user will view a portion of the advertisement that was not viewed during the previous viewing of the advertisement.

Continuing with the example above, if the skip time indicates that the advertisement was skipped by the user at 13 seconds, then the start time of 15 seconds may be selected to cause the advertisement to begin playback at 15 seconds. Notably, this process may continue for subsequent viewings of the advertisement, such that the user may be served a different portion of the advertisement each time, until the user has viewed each portion associated with the various start times. In some cases, the portion that is selected for viewing may include an overlap of the previously viewed portion. Continuing with the example above, if the skip time indicates that the advertisement was skipped by the user at 10 seconds, then in some embodiments the start time of 8 seconds may be selected because it is the closest start time to the skip time of 10 seconds.

Thus, the percentage of the advertisement that the user views is increased by virtue of the fact that the user views a different portion of the same advertisement during different viewing sessions. In this way, the likelihood of the advertisement's message getting conveyed is increased. In addition, the impact on a user's content consumption is minimal because the user retains control over the ability to skip advertisements.

Example Environment

Figure 1:
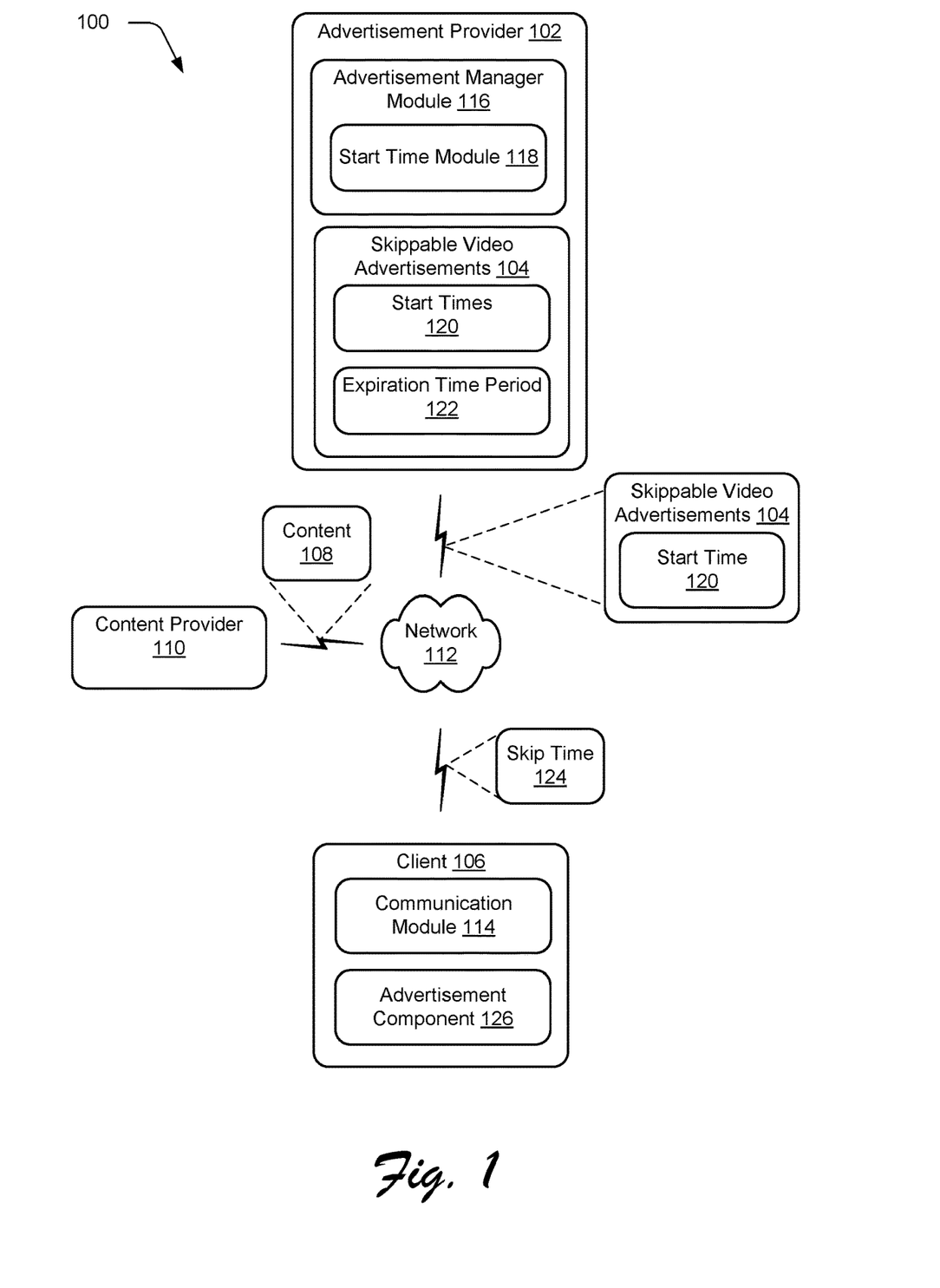
FIG. 1 is an illustration of a digital medium environment in an example implementation that is operable to employ techniques described herein.

FIG. 1 is an illustration of a digital medium environment 100 in an example implementation that is operable to employ techniques described herein. The digital medium environment 100 includes an advertisement provider 102 that is configured to provide skippable video advertisements 104 to clients 106. The skippable video advertisements 104 may be provided for playback prior to allowing the client 106 to view or interact with content 108 provided by a content provider 110. Advertisement provider 102, client 106, and content provider 110 are communicatively coupled, one to another, via a network 112. Computing devices that implement the advertisement provider 102, clients 106, and content provider 110 may be configured in a variety of different ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is described in some instances, the computing device may be representative of a plurality of different devices, such as multiple servers utilized by a business to perform operations "over the cloud" for the advertisement provider 102, further discussion of which may be found in relation to FIG. 9.

The client 106 is illustrated as having a communication module 114 that is configured to access the advertisement provider 102 and content provider 110 via the network 112, e.g., as web browsers, network enabled applications, and so forth and thus communication between the advertisement provider 102, client 106, and content provider 110 is accomplished via access to the network 112 in this digital medium environment for a user of the client to view skippable video advertisements 104 and content 108.

Although network 112 is illustrated as the Internet, the network may assume a wide variety of configurations. For example, network 112 may include a wide area network (WAN), a local area network (LAN), a wireless network, a public telephone network, an intranet, and so on. Further, although a single network 112 is shown, network 112 may also be configured to include multiple networks.

The advertisement provider 102 is illustrated as including an advertisement manager module 116 that is representative of functionality to control provision of skippable video advertisements 104 for playback by client 106, which may include video, single image splash screen, and so on. As described herein, a "skippable video advertisement" corresponds to a video advertisement which may be "skipped" by the user after the advertisement has been played back for a particular period of time. Advertisement manager module 116 may control skippable video advertisements 104 to be played back prior to enabling a user of client 104 to interact with content 108. For example, a user may navigate to a web page to interact with content 108, such as by viewing a video, listening to music, or accessing information available on the web page. Prior to being allowed to interact with the content 110, however, the user may be required to view a skippable video advertisement 104. Once the skippable video advertisement 104 has been played for a predefined period of time (e.g., 5 seconds) the user is allowed to "skip" the advertisement 104 in order to interact with content 108. In some cases, advertisements 104 are specifically associated with particular content 108 or web pages, such that the advertisement 104 will be provided in response to a user attempt to interact with content 108 or access the web page. Alternately, advertisements 104 may be provided across a variety of different web pages, or associated with different content, based at least in part on demographic information associated with a user of client 106.

The advertisement manager module 116 is further illustrated as including an advertisement start time module 118 that is representative of functionality to control the playback of different portions of skippable video advertisements 104 in the digital medium environment 100. To do so, the skippable video advertisements 104 are each pre-configured with a plurality of start times 120 that each corresponds to a different time within the advertisement to begin playback of the skippable video advertisement 104.

The skippable video advertisement 104 may also be configured with an expiration time period 122 which corresponds to a predefined period of time (e.g., 2 days) during which the skippable video advertisement 104 will be served to the client 104 based on a previous viewing of the advertisement by the client 106.

When a skippable video advertisement 104 is to be served to client 106, the advertisement start time module 118 may employ functionality to select one of the plurality of start times 120 associated with the advertisement 104 based on data identifying a skip time 124 corresponding to a time within the advertisement 104 at which the advertisement was skipped during a previous viewing of the advertisement by a user of client 106. The skip time 124 may be received from client 106 each time that skippable advertisement 104 is skipped by the user of client 106. Thus, advertisement start time module 118 determines which of the plurality of start times 120 to select based on the amount of the advertisement that was previously viewed by the user, as indicated by the skip time 124. For example, if the user previously skipped at 10 seconds into advertisement 104, then the advertisement start time module 118 may select a start time that corresponds to a portion of the skippable video advertisement 104 that occurs after 10 seconds. Advertisement provider 102 then serves the skippable video advertisement 104 to client 106 along with the selected start time 116 to cause client 106 to begin playback of the advertisement 104 from the selected start time 120.

The client 106 is further illustrated as including an advertisement component 126 that is representative of functionality to detect the start time 120, and cause playback of the skippable video advertisement 104 from the start time 120 in the digital medium environment 100. Advertisement component 126 can also determine the skip time 124 when the advertisement 104 is skipped during playback, and provide skip time 124 to advertisement provider 102 via network 112. In some cases, advertisement component 126 may be implemented as part of a media player that plays skippable video advertisements 104, as well as other content 110 such as digital videos or music.

Advertisement provider 102 receives advertisement skip time 124 from client device 102 and stores skip time 124 in a database (e.g., a lookup table). Skip time 124 may be stored in the database along with a client identifier of client 106 (or an identifier of the user of client 106) and an identifier of the advertisement 104. The identifier of the client 106 or the user, for example, may include an IP address, user login information, a device identifier, and so forth. Notably, the identifier of the advertisement 104 may be unique such that each advertisement is associated with a single unique identifier, such as a unique numeric or alphanumeric string. In this way, when the same advertisement 104 is subsequently selected for playback at the same client 106, or by the same user at a different client, start time module 118 can query the database using the client or user identifier and the advertisement identifier in order to locate the corresponding advertisement skip time 124. Doing so enables skip time 124 to be tracked across different websites and/or different browsers.

For example, if the user skips an advertisement 104 while viewing content within Facebook®, an identifier of the user or the client is stored in the database along with the skip time 124 and the unique advertisement identifier. Thus, if the advertisement 104 is subsequently provided to the user while the user is viewing content at YouTube®, the identifier of the user or the client is identified by start time module 118. Then, start time module 118 locates the skip time 124 associated with the identifier of the user or client, and causes playback of the advertisement 104 based on the skip time 124.

As another example, if the user skips an advertisement 104 while viewing content using a first browser, an identifier of the user or the client is stored in the database along with the skip time 124 and the unique advertisement identifier. Thus, if the advertisement 104 is subsequently provided to the user while the user is viewing content using a second browser, the identifier of the user or the client is identified by start time module 118. Then, start time module 118 locates the skip time 124 associated with the identifier of the user or client, and causes playback of advertisement 104 based on the skip time 124.

In one or more embodiments, start time module 118 may be at least partially implemented at client 106, such that the skip time 124 may be stored locally at the client 106. In this way, when an advertisement 104 is to be played back at client 106, the determination of the start time 120 at which to begin playback is determined at the client 106.

Figure 2:
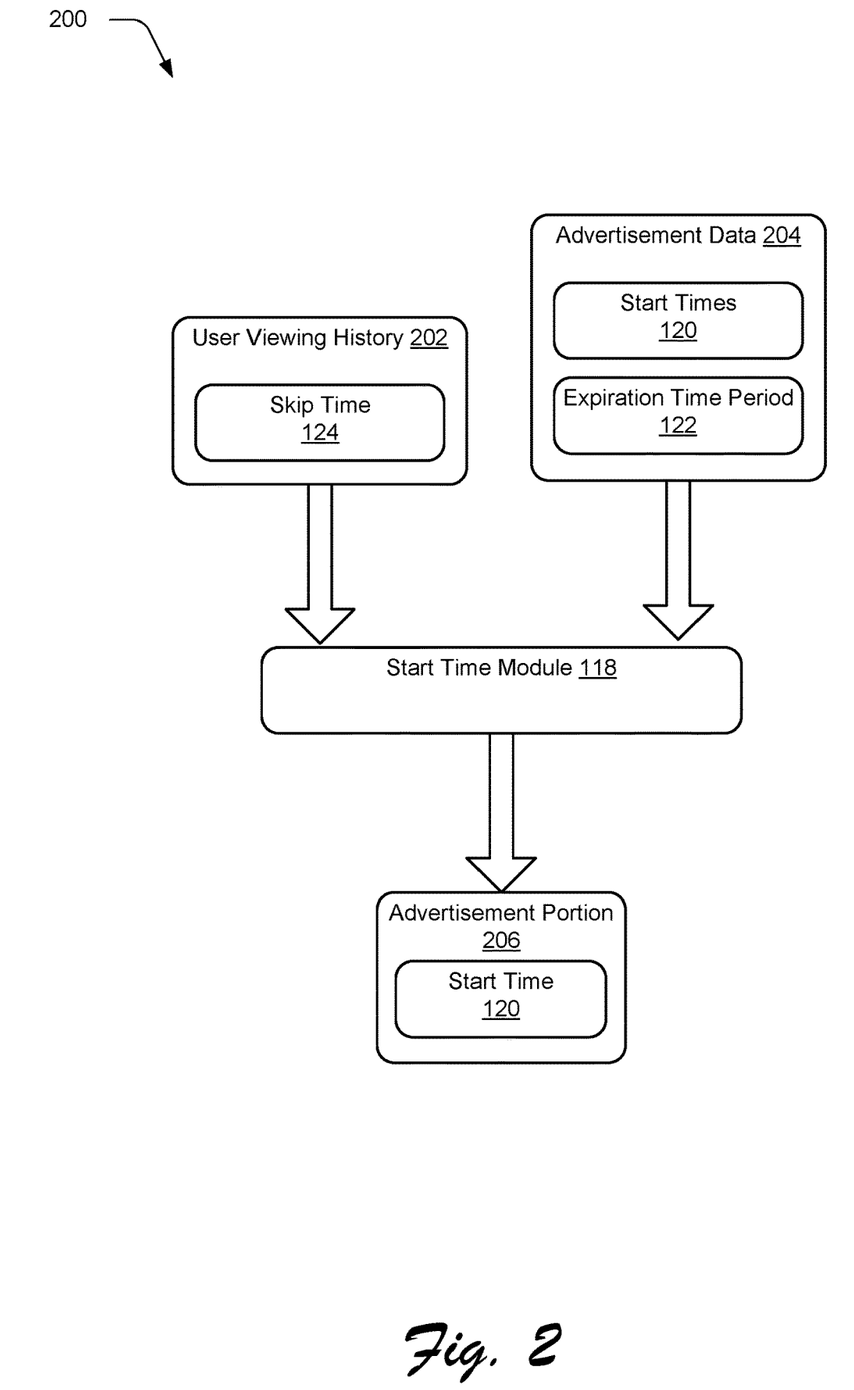
FIG. 2 illustrates a system in an example implementation in which operation of the start time module of FIG. 1 is shown in greater detail as determining a portion of an advertisement to serve to the client of FIG. 1.

FIG. 2 illustrates a system 200 in an example implementation in which operation of the start time module 118 of FIG. 1 is shown in greater detail as determining a portion of an advertisement to serve to the client 106 of FIG. 1.

When a skippable video advertisement 118 is selected for playback at the client 106, the start time module 118 accesses a user viewing history 202 and advertisement data 204 from a database implemented at advertisement provider 102 or remote from advertisement provider 102.

The user viewing history 202 includes data identifying an amount of the skippable advertisement 104 that the user has previously viewed. An illustrated example of user viewing history 202 includes skip time 120, which references a time within the skippable video advertisement 104 at which the user skipped the advertisement during a previous viewing of the skippable advertisement 104. The skip time 124, for example, may have been received from client 106 during a previous viewing of skippable advertisement 104.

As noted above, advertisement provider 102 is configured to store skip time 124 in a database (e.g., a lookup table) along with a client identifier of client 106 (or an identifier of the user of client 106) and a unique identifier of advertisement 104. In this way, when the same advertisement 104 is subsequently selected for playback at the same client 106, or by the same user at a different client, start time module 118 can query the database using the user or client identifier and the advertisement identifier in order to locate the corresponding advertisement skip time 124.

Notably, the user viewing history 202 may include any type of data identifying the user's previous viewing of skippable advertisement 104, such as the date and time at which the user previously viewed the advertisement 104, the total amount of the advertisement 104 that the user has viewed, and so forth. If the user has not previously viewed the skippable video advertisement 104, then start time module 118 may determine that the user has not previously viewed advertisement 104 due to the absence of the skip time 124 in the user viewing history 204.

Advertisement data 204 references different portions of the skippable video advertisement 104. Illustrated examples of advertisement data 204 includes a plurality of start times 120 and an expiration time period 122. Each of the plurality of start times 120 define a different time within the skippable video advertisement 104 to begin playback of the skippable video advertisement. As described above, the expiration time period 122 corresponds to a predefined period of time (e.g., 2 days) during which the skippable video advertisement 104 will be served to the client 104 based on a previous viewing of the advertisement by the client 106. Advertisement data 202 may also include any type of data that enables start time module 118 to identify different portions of skippable advertisement 104 for playback by client 106.

Figure 3:
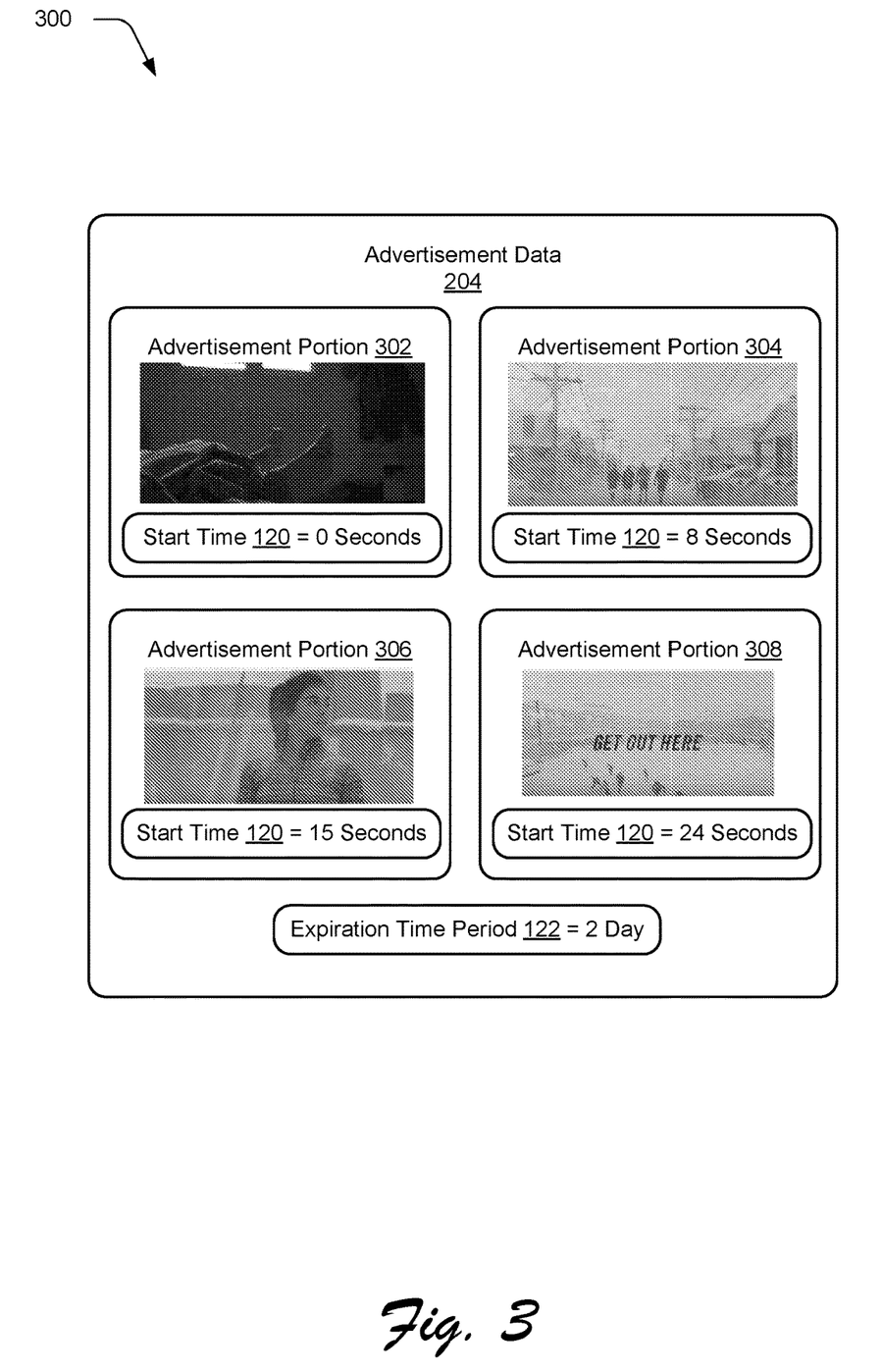
FIG. 3 illustrates an example of advertisement data for a skippable video advertisement.

As an example of advertisement data 204, consider FIG. 3 which illustrates an example 300 of advertisement data 204 for a skippable video advertisement 104. In example 300, advertisement data 204 is associated with a skippable video advertisement 104 that is 30 seconds in length. The advertisement data includes four different advertisement start times 120, corresponding to times within the 30 second advertisement, which in this example include start times of 0 seconds, 8 seconds, 15 seconds, and 24 seconds. These start times each correspond to different portions 302, 304, 306, and 308 of the advertisement 104. For example, portion 302 has a start time at 0 seconds within advertisement 104, portion 304 has a start time at 8 seconds within advertisement 104, portion 306 has a start time at 15 seconds within advertisement 104, and portion 308 has a start time at 24 seconds within advertisement 202.

In this example, each portion depicts a scene of the advertisement that will be played back from the respective start time 120. For example, advertisement portion 302 includes a scene of an athlete's feet lying in a bed, advertisement portion 304 includes an image of four athletes walking in the snow, advertisement portion 306 includes an image of a woman athlete, and portion 308 includes an image of multiple athletes playing football in the snow along with the words "Get out here". Notably, if advertisement 120 were to be played back, uninterrupted from start to finish, each of these scenes would be displayed within the advertisement at their respective start times. However, because users often skip the skippable video advertisement 104 prior to completion of the advertisement, the advertisement 104 may rarely be viewed during a single viewing. In this example, advertisement 202 is also associated with an expiration time period 122, which in this case corresponds to 2 days.

The start time module 118 is implemented to analyze the user viewing history 202 (e.g., skip time 124) and the advertisement data 204 (e.g., start times 120 and expiration time period 122) to determine an advertisement portion 206, corresponding to a portion of the skippable video advertisement 104, for playback by client 106 beginning from a start time 120.

In one or more embodiments, start time module 118 determines the advertisement portion 206 by selecting one of a plurality of start times 120 associated with the skippable video advertisement 104 based at least in part on the skip time 124. For example, the start time module 118 can determine that the user has not previously viewed the advertisement 104 based on the absence of data identifying a skip time 124 associated with the user. In this case, start time module 118 may select a start time 120 which corresponds to a beginning of the advertisement 104.

However, if a skip time 124 is associated with the user, then the start time module 118 selects one of the plurality of start times 120 corresponding to a portion of the advertisement 104 that has not been previously viewed (or at least not completely viewed) by the user of client 106.

Start time module 118 may select a next one of the plurality of start times 120 that corresponds to a time within advertisement 104 that occurs after skip time 124. Alternately, start time module 118 may select one of the plurality of start times 120 that corresponds to a time within advertisement 104 that is closest in time to the skip time 124. In order to understand the difference between these two different configurations, consider the following example. Assume that the user has previously viewed the advertisement 104 depicted in FIG. 2, and that the skip time 124 corresponds to 10 seconds. In this case, if the start time module 118 is configured to select a start time 120 that occurs after the skip time, then the start time module 118 may select a start time of 15 seconds because the start time of 15 seconds is the next start time that occurs after 10 seconds. Alternately, if the start time module 118 is configured to select the start time 120 that is closest to the skip time, then the start time 120 of 8 seconds may be selected because it is closer (2 second difference) to the skip time 124 of 10 seconds than the start time 120 of 15 seconds (5 second difference). Notably, the start time module 118 may be configured to select the start time 120 based on the above described examples, as well as using other types of criteria to determine portions of advertisement 104 that have not been previously viewed by the user of client 106.

In some cases, the start time module 124 may select one of the plurality of start times based on whether or not the user's previous viewing of the advertisement 104 is within the expiration time period 122. For example, if the start time module 124 determines that the previous viewing occurred outside of the expiration time period (e.g., the expiration time period is 2 days, the user viewed the advertisement 104 on Monday, and it is currently Friday), then the start time module 124 may select the start time 120 that corresponds to a beginning of the advertisement 104.

Figure 4:
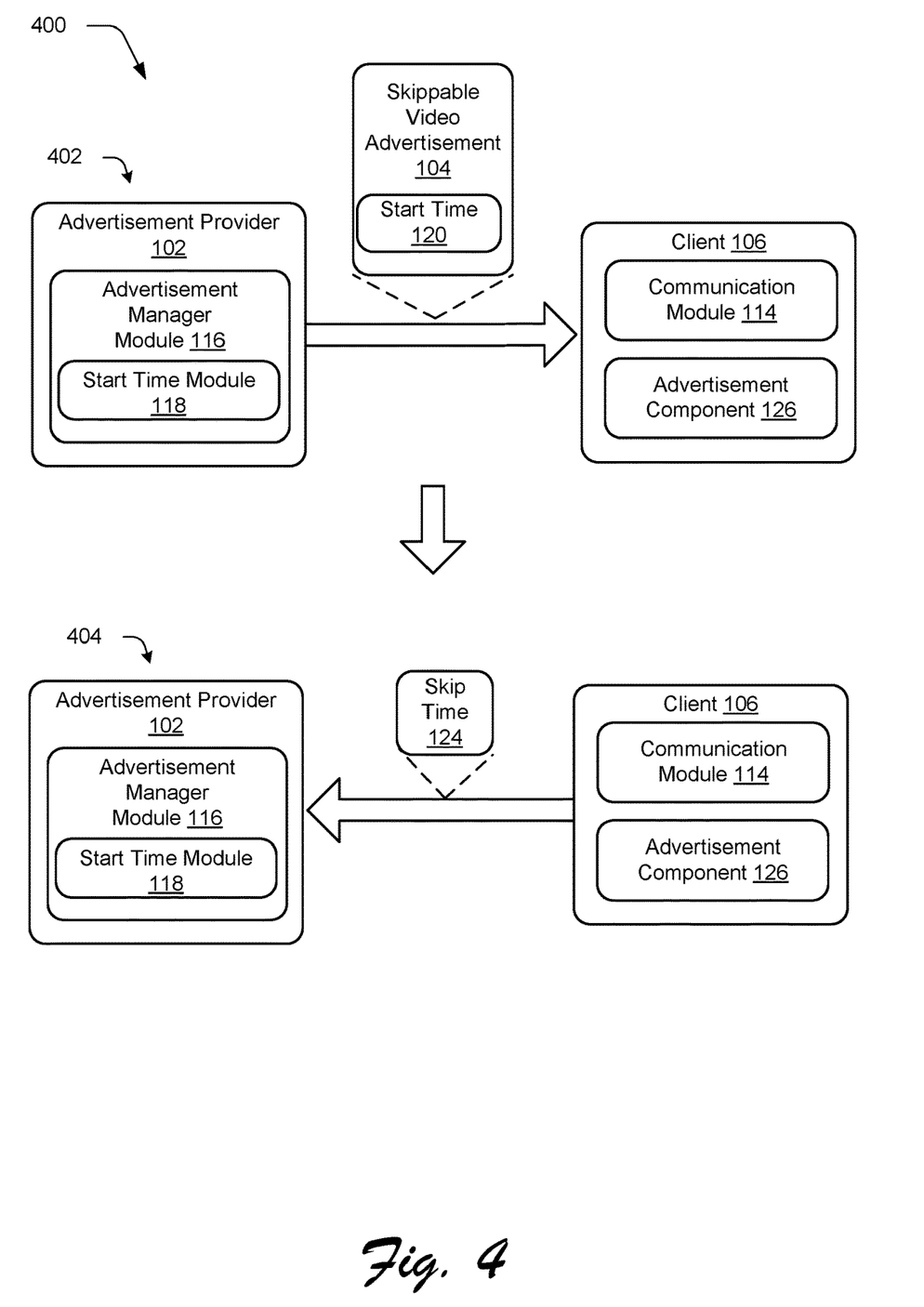
FIG. 4 illustrates a system in an example implementation in which operation of the start time module of FIG. 1 is shown in greater detail as providing an advertisement and a start time to the client of FIG. 1, and receiving a skip time from the client.

FIG. 4 illustrates a system 400 in an example implementation in which operation of the start time module 118 of FIG. 1 is shown in greater detail as providing an advertisement and a start time to the client 106 of FIG. 1, and receiving a skip time from the client 106. The system 400 is illustrated through the use of a first stage 402 and a second stage 404.

At first stage 402, an advertisement 104 is selected, and advertisement start time module 118 determines a start time based on based on skip time 124, as described in more detail in FIG. 2. If the user has not previously viewed advertisement 104, then a start time corresponding to a beginning of the advertisement (e.g., 5 seconds) may be selected.

Next, advertisement provider 102 provides the advertisement 104, along with the selected start time 120, to client 106, to cause playback of advertisement 104 from the selected start time 120. In one or more embodiments, if the start time 124 corresponds to the beginning of the advertisement, then advertisement provider may provide advertisement 104 without a start time.

Communication module 114 of client 106 receives the advertisement 104 and begins playback of advertisement 104 from start time 120. If this is the first time that the advertisement 104 has been served to client 106, then client 104 will cause playback of the advertisement 104 from the beginning of the advertisement.

Figure 5:
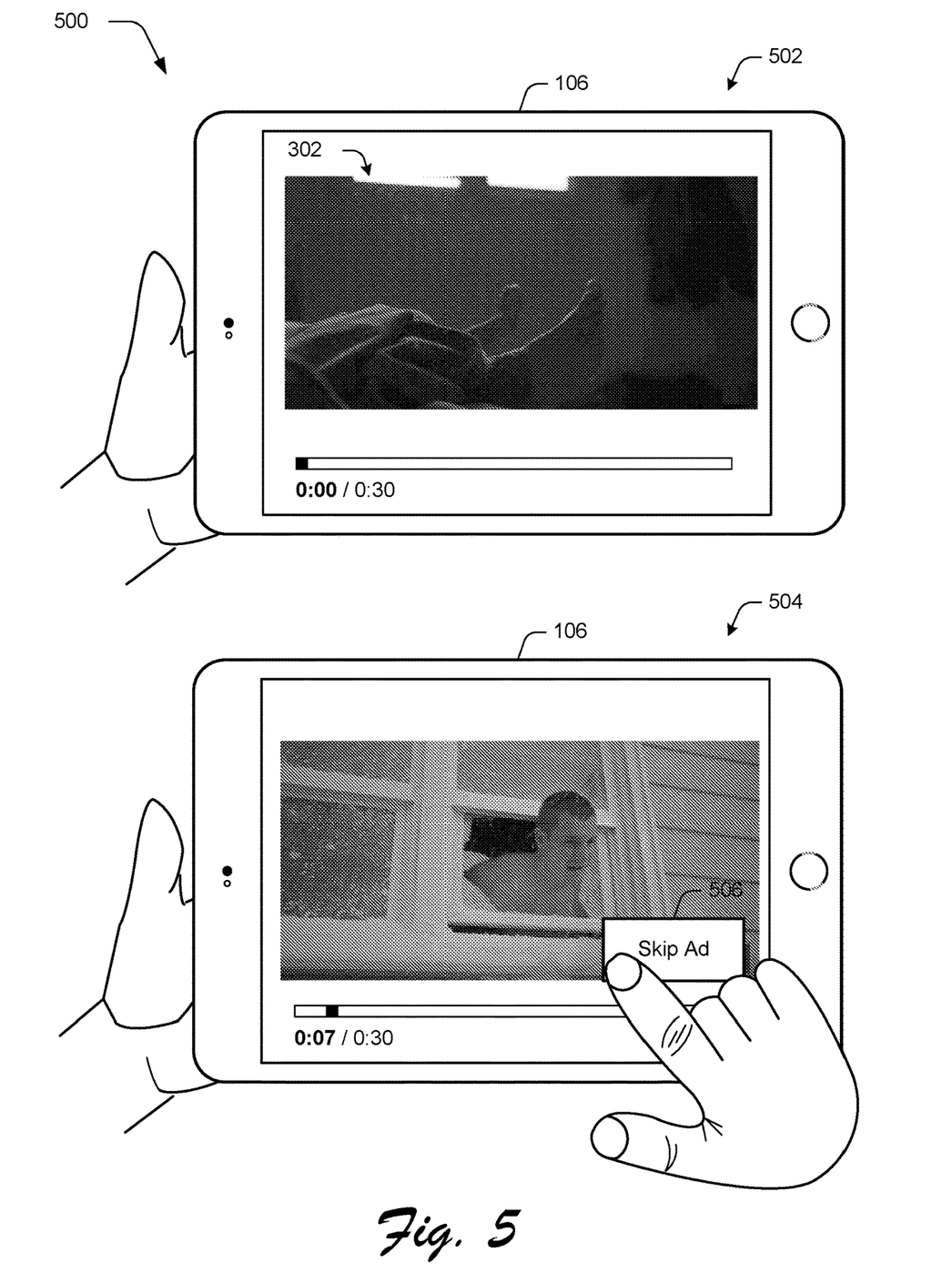
FIG. 5 illustrates an example of playback of an advertisement in accordance with one or more embodiments.

Consider, for example, FIG. 5 which illustrates an example 500 of playback of an advertisement in accordance with one or more embodiments. At a first stage 502, client 106 plays back portion 302 of advertisement 120 of FIG. 3 (which corresponds to the beginning of advertisement 104).

After advertisement 104 has been played back for a predefined period of time (e.g., 5 seconds) advertisement component 126 causes display of a skip control which is selectable to skip the remainder of advertisement 104 in order to enable the user of client 106 to interact with content 108, such as by viewing a video, accessing information, or listening to music.

As an example, at a second stage 504, advertisement component 126 causes display of a skip control 506 after advertisement 104 has been played back for a predefined period of time (e.g., 5 seconds). At 7 seconds within advertisement 104, a user selection of skip control 506 is received when a user touches skip control 506. When skip control 502 is selected, advertisement component 126 skips playback of advertisement 104 to enable the user of client 106 to interact with content 108, and detects the time at which the skip control 506 is selected (7 seconds) as the skip time 124.

Returning to FIG. 4, at second stage 404, advertisement component 124 causes communication of skip time 124 to advertisement provider 102. For example, returning to example 500, advertisement component 124 would provide a skip time 124 of 7 seconds because that is the time at which the user skipped advertisement 112.

Advertisement provider 102 receives advertisement skip time 124 from client device 102 and stores skip time 124 in a database (e.g., a lookup table). Skip time 124 may be stored in the database along with a client identifier of client 106 (or an identifier of the user of client 106) and an identifier of advertisement 104. In this way, when the same advertisement 104 is subsequently selected for playback at the same client 106, start time module 118 can query the database using the client identifier and the advertisement identifier in order to locate the corresponding advertisement skip time 124.

Figure 6:
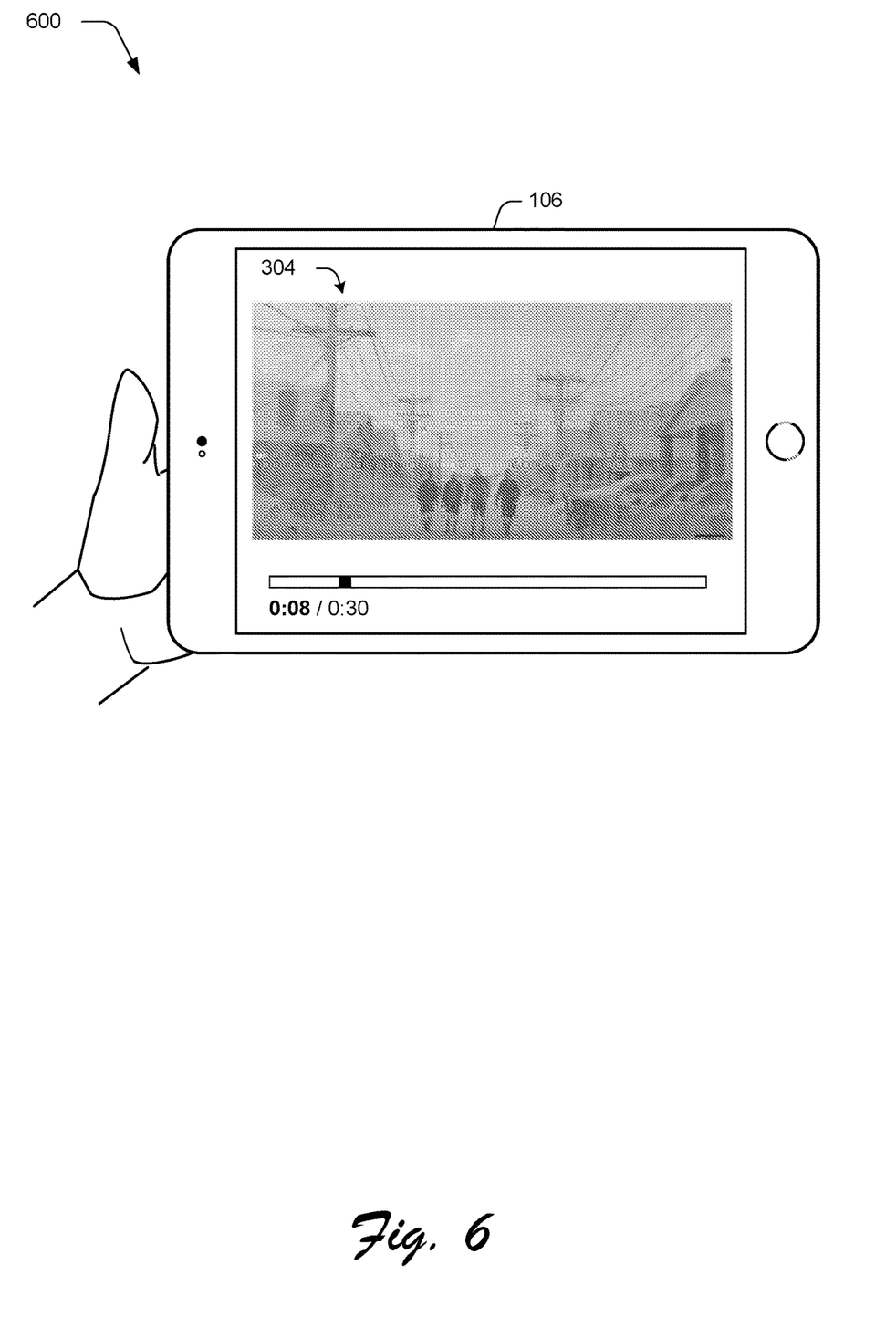
FIG. 6 illustrates an example of playback of an advertisement in accordance with one or more embodiments.

If advertisement 104 is again selected for playback at client device 104, start time module 118 queries the database to determine whether advertisement 104 has been previously viewed at client device 102. Consider for example, FIG. 6 which illustrates an example 600 of playback of an advertisement in accordance with one or more embodiments. In this example, because the user had previously watched 7 seconds of the advertisement, the start time module 118 selects a start time of 8 seconds, corresponding to portion 304 of the advertisement. Thus, client 106 receives advertisement 104 and a start time of 8 seconds from advertisement provider 102, and begins playback of advertisement 104 from the start time of 8 seconds. In this way, the user will have viewed 7 seconds of the advertisement during a first viewing, and then will have viewed at least 5 seconds of the advertisement starting from the start time of 8 seconds. Of course, the user can continue to skip the advertisement each time, but the user will have viewed different portions of the video each time thereby increasing the percentage of the advertisement 104 that the user will view. In one or more embodiments, if the user has viewed portions of the advertisement 104 corresponding to each of the plurality of start times 102, then skip times 124 may be cleared.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
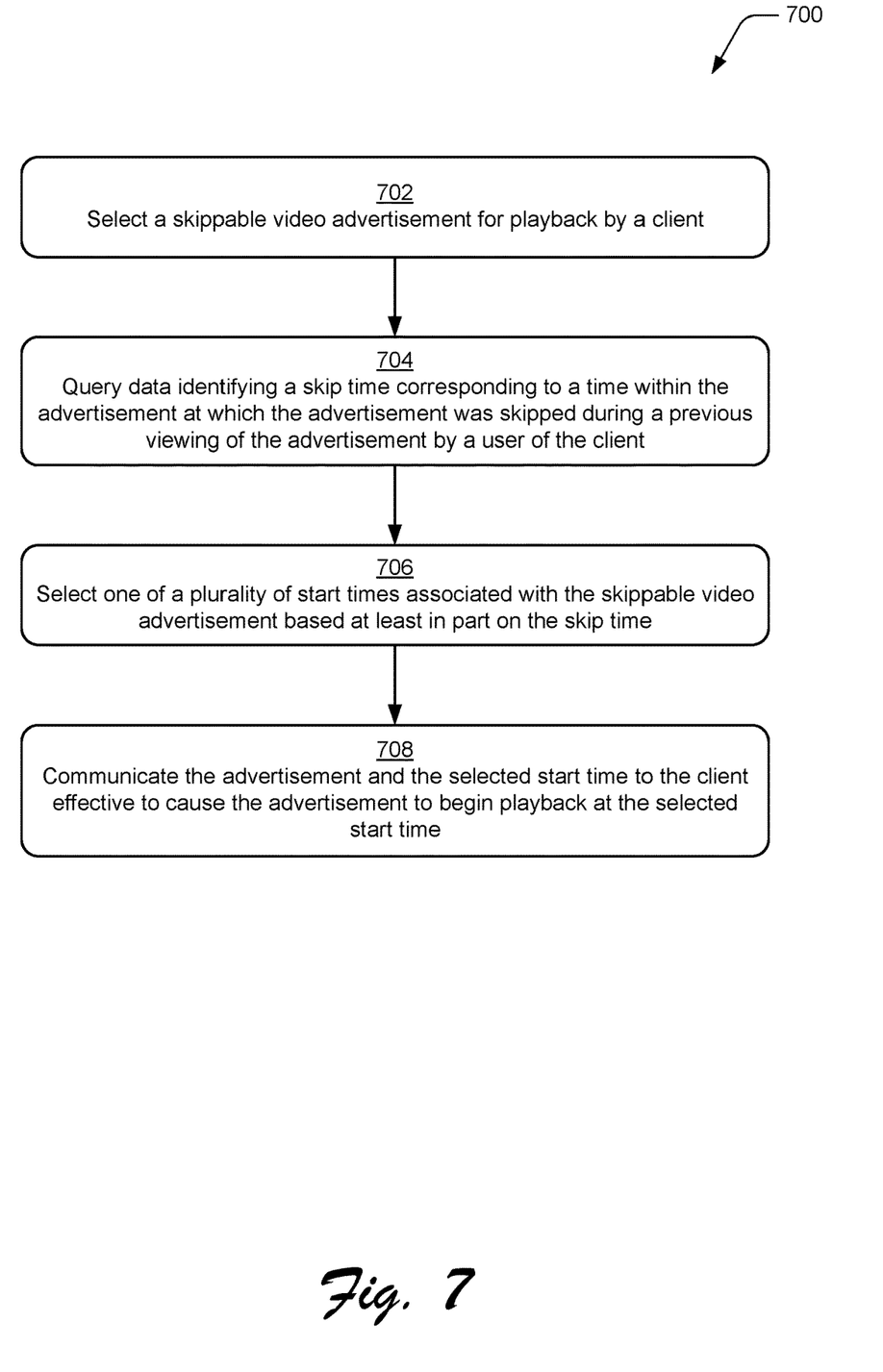
FIG. 7 depicts a procedure in an example implementation in which an advertisement and a start time are provided to a client to cause the client to begin playback of the advertisement from the start time.

FIG. 7 depicts a procedure 700 in an example implementation in which an advertisement and a start time are provided to a client to cause the client to begin playback of the advertisement from the start time.

At 702, a skippable video advertisement is selected for playback by a client. For example, advertisement manager module 116 selects a selectable video advertisement 104 for playback by a client 104.

At 704, data is queried, corresponding to a time within the skippable video advertisement at which the skippable video advertisement was skipped during a previous viewing of the skippable video advertisement by a user of the client. For example, start time module 118 queries data identifying skip time 124 corresponding to a time within the skippable video advertisement 104 at which the advertisement was skipped during a previous viewing of the advertisement by a user of the client 106.

At 706, one of a plurality of start times associated with the skippable video advertisement is selected based at least in part on the skip time. For example, start time module 118 selects one of the start times 120 associated with the skippable video advertisement 104 based at least in part on the skip time 124.

At 708, the skippable video advertisement and the selected start time are provided to the client effective to cause the skippable video advertisement to begin playback at the selected start time. For example, advertisement provider 102 provides the skippable video advertisement 104 and the selected start time 120 to the client 106 effective to cause the skippable video advertisement 104 to begin playback at the selected start time 120.

Figure 8:
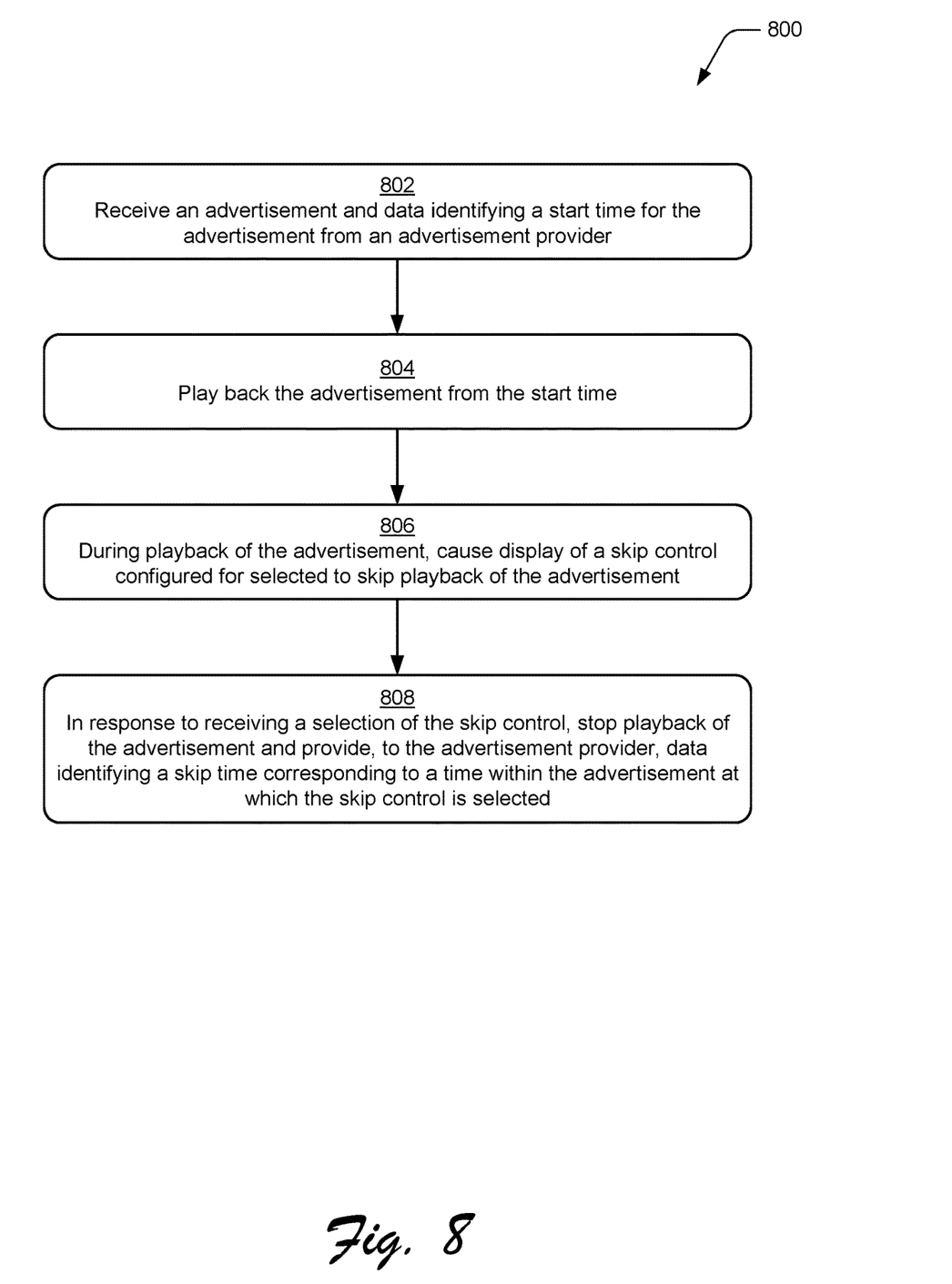
FIG. 8 depicts a procedure in an example implementation in which a client plays back a skippable video advertisement.

FIG. 8 depicts a procedure 800 in an example implementation in which a client plays back a skippable video advertisement.

At 802, a skippable video advertisement and data identifying a start time for the skippable video advertisement is received from an advertisement provider. For example, communication module 114 of client 106 receives a skippable video advertisement 104 and data identifying a start time 124 for the skippable video advertisement 124 from an advertisement provider 102. The start time 124 corresponds to a time within the skippable video advertisement 104 at which playback of the skippable video advertisement 104 is to begin.

At 804, the skippable video advertisement is played back from the start time. For example, client 106 causes playback of the skippable video advertisement 104 from the start time 120.

At 806, during playback of the skippable video advertisement, a skip control configured for selection to skip playback of the skippable video advertisement is displayed. For example, advertisement component 126 causes display of a skip control 506 configured for selection to skip playback of the skippable video advertisement 104.

At 808, in response to receiving a selection of the skip control, playback of the skippable video advertisement is stopped, and data identifying a skip time corresponding to a time within the skippable video advertisement at which the skip control is selected is provided to the advertisement provider. For example, advertisement component 126 cause playback of the skippable video advertisement 104 to stop, and provides and data identifying the skip time 124 corresponding to a time within the skippable video advertisement 104 at which the skip control 506 is selected to the advertisement provider 102.

Example System and Device

Figure 9:
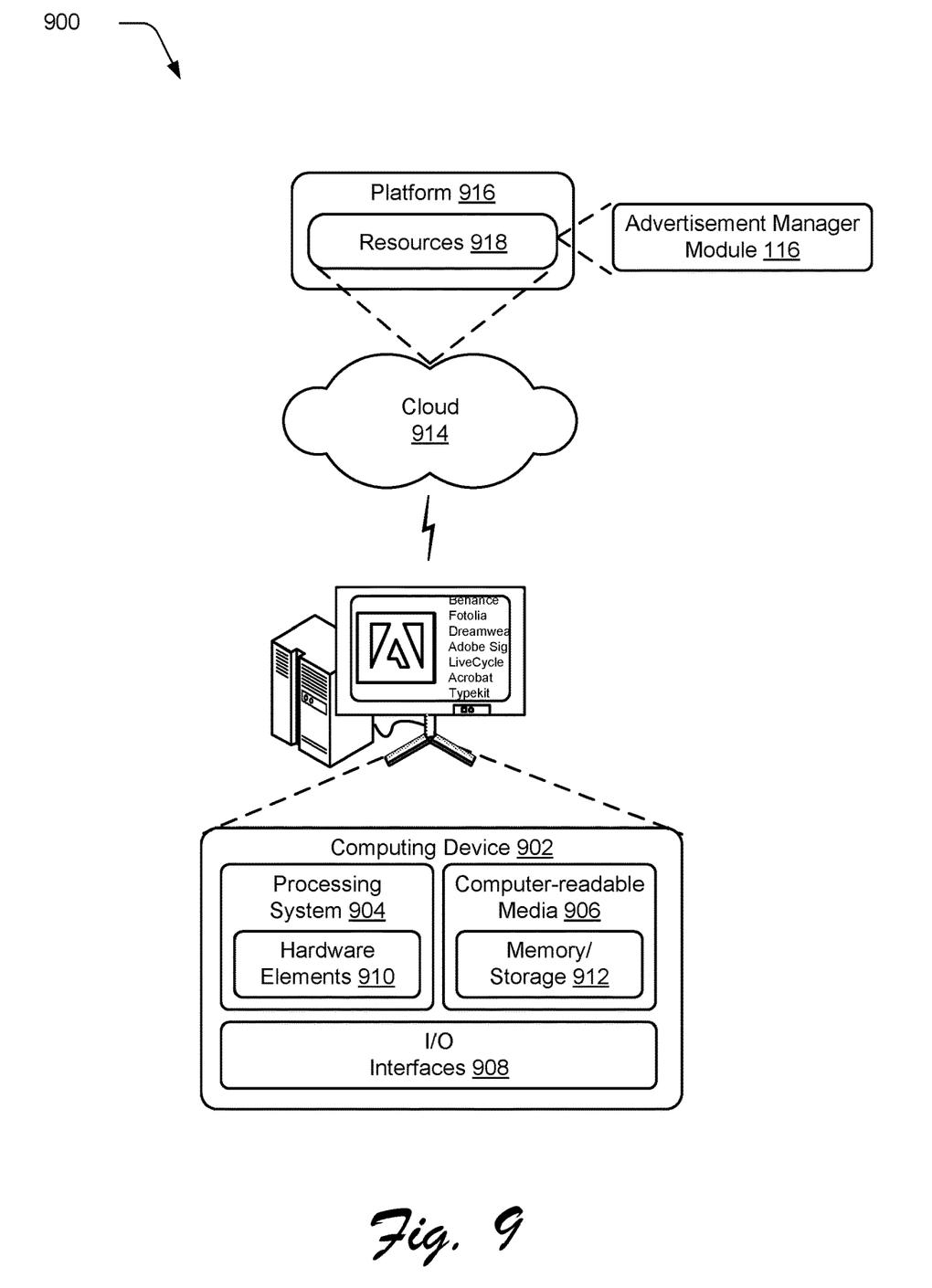
FIG. 9 illustrates an example system that includes an example computing device that is representative of one or more computing systems and/or devices that may implement the various techniques described herein.

FIG. 9 illustrates an example system generally at 900 that includes an example computing device 902 that is representative of one or more computing systems and/or devices that may implement the various techniques described herein. This is illustrated through inclusion of the advertisement manager module 116. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to control a start time at which a single skippable video advertisement made available by an advertisement provider begins playback at a client associated with a user, a method implemented by at least one computing device comprising:
   selecting, by the at least one computing device, the single skippable video advertisement for playback by the client, the single skippable video advertisement associated with a plurality of different start times which are predefined by the advertisement provider;
   querying data stored in a database associated with the advertisement provider, by the at least one computing device, to identify a skip time corresponding to a time within the single skippable video advertisement at which the single skippable video advertisement was skipped during a previous viewing of the single skippable video advertisement by the user of the client, the skip time stored in the database along with an identifier of the client, a unique identifier of the single skippable video advertisement, and an expiration time period;
   selecting, by the at least one computing device, one of the plurality of different start times within the single skippable video advertisement that is subsequently closest to the skip time based on the skip time, the identifier of the client, the expiration time period, and the unique identifier of the single skippable video advertisement; and
   providing the single skippable video advertisement and the selected start time to the client effective to cause the single skippable video advertisement to begin playback at the selected start time.

2. The method as described in claim 1, wherein the selecting one of the plurality of different start times comprises:
   determining that the user has not previously viewed the single skippable video advertisement based at least in part on an absence of the data identifying the skip time; and
   selecting one of the plurality of different start times corresponding to a beginning of the single skippable video advertisement.

3. The method as described in claim 1, wherein the selecting one of the plurality of different start times comprises:
   determining that the data includes the expiration time period;
   determining that the previous viewing of the single skippable video advertisement by the user occurred outside of the expiration time period; and
   selecting one of the plurality of different start times corresponding to a beginning of the single skippable video advertisement.

4. The method as described in claim 1, further comprising, prior to the selecting one of the plurality of different start times:
   receiving, from the client, the data identifying the skip time; and
   storing the data in the database such that the skip time is associated with the identifier of the client, the unique identifier of the single video advertisement, and the expiration time period.

5. The method as described in claim 4, further comprising:
   receiving, from the client, additional data identifying an additional skip time corresponding to an additional viewing of the single skippable video advertisement by the user at the client; and
   storing the additional skip time in the database to replace the skip time associated with the previous viewing of the single skippable video advertisement by the user.

6. The method as described in claim 1, wherein the single skippable video advertisement is provided to the client for playback prior to allowing user interaction with content.

7. The method as described in claim 1, wherein the single skippable video advertisement comprises a single skippable video advertisement that enables the user to skip the single skippable video advertisement, and interact with the content, after the single skippable video advertisement has been played back at the client for a predefined period of time.

8. The method as described in claim 1, wherein the selected start time corresponds to a beginning of the single skippable video advertisement.

9. The method as described in claim 1, wherein the selected start time corresponds to a time other than a beginning of the single skippable video advertisement.

10. The method as described in claim 1, wherein the expiration time period corresponds to a predefined period of time during which the single skippable video advertisement will be served to the client based on the previous viewing of the single skippable video advertisement.

11. The method as described in claim 10, wherein responsive to determining that the previous viewing of the single skippable advertisement is outside of the expiration time period, selecting a beginning of the single skippable video advertisement as the start time.

12. The method as described in claim 1, wherein the selection one of the plurality of different start times is performed if the identifier of the client is associated with the unique identifier of the advertisement and the skip time and the previous viewing of the single skippable video advertisement is within the expiration time period.

13. The method as described in claim 1, wherein the plurality of different start times are arranged in a chronological order within the single skippable video advertisement.

14. In a digital medium environment to control a start time at which a single skippable video advertisement is played back at a client associated with a user, a system comprising:
  at least a memory and a processor to perform operations comprising:
    selecting the single skippable video advertisement for playback by the client, the single skippable video advertisement associated with a plurality of different start times within the single skippable video advertisement;
    querying data stored in a database to identify a skip time corresponding to a time within the single skippable video advertisement at which the single skippable video advertisement was skipped during a previous viewing of the single skippable video advertisement by the user of the client, the skip time stored in the database along with an identifier of the client, a unique identifier of the single skippable video advertisement, and an expiration time period;
    selecting one of the plurality of different start times within the single skippable video advertisement that is subsequently closest to the skip time based on the skip time, the identifier of the client, the expiration time period, and the unique identifier of the single skippable video advertisement; and
    providing the single skippable video advertisement and the selected start time to the client effective to cause the single skippable video advertisement to begin playback at the selected start time.

15. The system as described in claim 14, wherein the selecting one of the plurality of different start times comprises:
  determining that the user has not previously viewed the single skippable video advertisement based at least in part on an absence of the data identifying the skip time; and
  selecting one of the plurality of different start times corresponding to a beginning of the single skippable video advertisement.

16. The system as described in claim 14, wherein the selecting one of the plurality of different start times comprises selecting a start time that corresponds to a time within the single skippable video advertisement that occurs after the skip time.

17. The system as described in claim 14, wherein the selecting one of the plurality of different start times comprises selecting a start time that is corresponds to a time within the single skippable video advertisement that is closest in time to the skip time.

18. The system as described in claim 14, wherein the selecting one of the plurality of different start times comprises:
  determining that the data includes the expiration time period;
  determining that the previous viewing of the single skippable video advertisement by the user occurred outside of the expiration time period; and
  selecting one of the plurality of different start times corresponding to a beginning of the single skippable video advertisement.

19. The system as described in claim 14, further comprising, prior to the selecting one of the plurality of different start times:
  receiving, from the client, the data identifying the skip time; and
  storing the data in the database such that the skip time is associated with the identifier of the client, the unique identifier of the single video advertisement, and the expiration time period.

20. The system as described in claim 19, further comprising:
  receiving, from the client, additional data identifying an additional skip time corresponding to an additional viewing of the single skippable video advertisement by the user at the client; and
  storing the additional skip time in the database to replace the skip time associated with the previous viewing of the single skippable video advertisement by the user.

* * * * *